United States Patent [19]

Coleman

[11] 3,757,100
[45] Sept. 4, 1973

[54] TRIGONOMETRIC SEGMENT DISCRIMINATOR

[75] Inventor: Martin R. Coleman, Los Angeles, Calif.

[73] Assignee: Leak Siegler, Inc., Santa Monica, Calif.

[22] Filed: Mar. 13, 1972

[21] Appl. No.: 234,039

[52] U.S. Cl............. 235/197, 235/150.22, 235/186, 307/231, 318/593, 328/158
[51] Int. Cl........................... G06g 7/26, G06g 7/22
[58] Field of Search.................... 235/186, 189, 197, 235/150.2, 150.22, 150.23, 150.26, 150.27; 328/150, 156, 158, 169, 173; 307/229, 231, 232, 235; 318/592, 593

[56] References Cited
UNITED STATES PATENTS

| | | | |
|---|---|---|---|
| 2,922,991 | 1/1960 | Frank | 318/593 X |
| 3,151,282 | 9/1964 | Fisher | 318/592 |
| 3,571,578 | 3/1971 | Fry | 235/150.2 X |
| 3,671,728 | 6/1972 | Day et al. | 235/186 X |

*Primary Examiner*—Joseph F. Ruggiero
*Attorney*—Harold L. Jackson, Eric T. S. Chung et al.

[57] ABSTRACT

A trigonometric segment discriminator circuit for selecting a portion of a sinusoidal signal for use as a control signal, is disclosed. Sinusoidal signals in the form of coarse since and fine cosine signals are applied to the discriminator circuit to produce an inhibit signal which, when summed with a selected zero cross-over portion of a fine signal, provides a control signal characterized by a generally linearly increasing segment extending between steady state low and high portions. The discriminator circuit includes a pair of operational amplifiers that are connected in parallel to respectively provide a high, a low, and a zero output voltage signal in response to the level of the fine cosine and coarse sine signals applied thereto. A limiting amplifier may be used as a summing circuit to combine the inhibit signal with the fine sine signal.

8 Claims, 4 Drawing Figures

3,757,100

TRIGNOMETRIC SEGMENT DISCRIMINATOR

BACKGROUND OF THE INVENTION

1. Field of the Invention

This invention generally relates to circuitry useable in conjunction with control systems to select a certain portion of a sinusoidal waveform for control purposes. More particularly, the present invention concerns a discriminator circuit that may be used with aircraft control systems to particularly identify, and employ as a control signal, a unique portion of a sinusoidal signal which is correlated to aircraft altitude.

2. Description of the Prior Art

In the flying of large aircraft it is common practice to have a pilot set an automatic pilot device prior to, or soon after, takeoff. The automatic pilot controls the aircraft to automatically proceed to a desired altitude and maintain that altitude until a change is effected by the pilot. As an example, a large jet aircraft may be assigned to a level of 20,000 feet for exit from the control area of an airport. The pilot would simply manipulate the appropriate controls on his instrument panel to have the aircraft attain and maintain that altitude until leaving the control area. Other aircraft in the control area surrounding the airport may be assigned altitudes as near as 19,000 or 21,000 feet. Clearly, the mere 1,000 feet separating the adjacent flying levels makes the accuracy of automatic pilots critical to the point that some governmental regulations require accuracies within a tolerance of ± 25 feet.

A typical automatic flight control apparatus may include an air data computer having synchros which provide sinusoidal waveforms that are related to actual altitude. These sinusoidal waveforms often are provided as fine and coarse signals that are related by a predetermined multiple and used in combination to provide altitude indications and control. The coarse signal may be simply considered as a lower frequency signal.

Where it is possible to have a large voltage range for a control signal, i.e., 0 to 150 volts, the cross-over portion of the coarse signal approximates a straight line and may be sufficient to provide altitude control. However, for reasons of compatibility with other equipment in the control system, such a large voltage range for a single component is usually not readily possible since the system voltages are typically much smaller, i.e., 25 volts, or less. Accordingly, the coarse signal has a slope insufficient to give the required resolution when used alone.

The fine signal on the other hand has a higher rate of change and thus includes zero cross-over segments that could provide acceptable altitude resolution. However, the fine signal will usually include several complete cycles to span the range of operating altitudes of an aircraft and the voltage levels of the fine signal are therefore not unique to a single altitude.

The coarse and fine signals have been employed in combination to provide altitude indications and control. Difficulties in providing a low degree of error yet persist due to numerous factors such as the use of mechanical gearing to maintain a selected phase relationship between fine and coarse signals. For example, the mechanical gearing inherently tends to produce more ambiguity in resolution than is permitted by governmental regulations.

It is accordingly the intention of the present invention to provide a discriminator circuit that will select and employ cetain portions of both the coarse and fine signals provided by the synchros of an air data computer to provide a highly accurate altitude control signal.

SUMMARY OF THE INVENTION

Briefly described, the present invention involves a discriminator circuit that operates to select and provide a certain zero cross-over portion of a sinusoidal signal as a control signal.

More particularly, the subject discriminator circuit includes a pair of operational amplifiers connected to mutually receive a signal having an amplitude that linearly varies between selected negative and positive values. A sign sensor circuit and an inverter circuit are connected in series and serve to provide a square wave that varies between zero and a selected negative voltage level in response to a cosine function applied to the sign sensor circuit. The square wave is directly out-of-phase with the cosine function and is applied to both operational amplifiers which respond by providing an inhibit signal which is characterized by having a first portion at a constant negative level and a second portion at a constant positive level. The first and second portions are separated by a zero or neutral portion. The first and second portions serve to mask corresponding portions of the sinusoidal signal with which the inhibit signal is combined. The neutral portion permits the corresponding portion of the sinusoidal signal to be passed. The resulting control signal accordingly includes the passed portion of the sinusoidal signal interposed between the first and second portions of the inhibit signal.

The objects and many attendant advantages of the invention will be more readily appreciated as the same becomes better understood by reference to the following detailed description which is to be considered in connection with the accompanying drawings wherein like reference symbols designate like parts throughout the figures thereof.

DESCRIPTION OF THE PREFERRED EMBODIMENT

Figure 1:
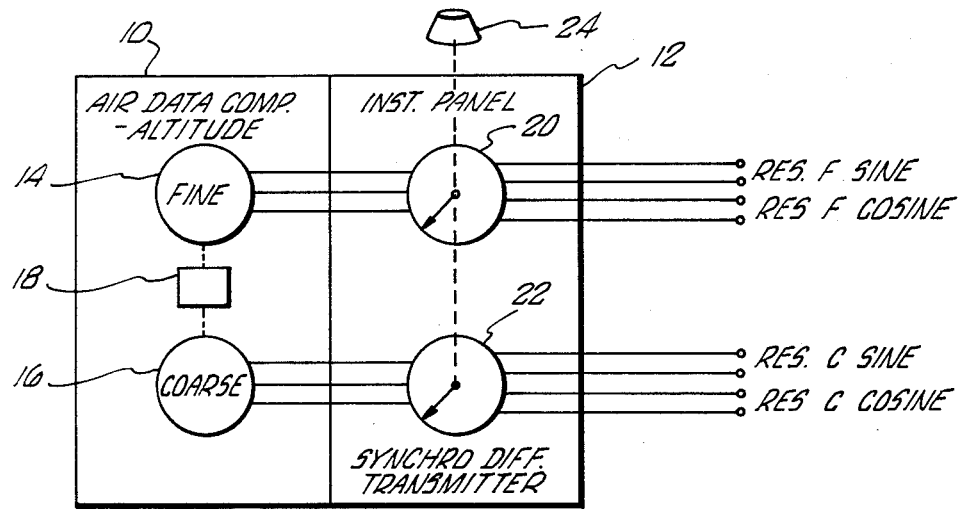
FIG. 1 is a schematic diagram illustrating an exemplary synchro combination that may be used to provide fine and coarse sinusoidal signals that may be applied to a discriminator circuit in accordance with the present invention.

By way of background, a typical aircraft control system may include an air data computer 10 and an instrument panel 12 as shown by FIG. 1. The air data computer 10 generally receives information from various instruments aboard an aircraft and employs such information to provide control signals, etc. The instrument panel 12 would generally include a plurality of visually observable gages, meters, etc. and a plurality of switches, knobs, or other manually operated controls.

Among the output signals provided by the data computer 10 are sinusoidal signals representing the actual altitude of an aircraft. These signals may typicallly be provided by a pair of synchros 14 and 16 which are mechanically geared by a gear train 18 to respectively provide fine and coarse signals. Each of the synchros 14 and 16 would produce both sine and cosine signals at the standard three wire output.

The mechanical gearing ratios used, for example, may be in the neighborhood of 27:1, although any desired gear ratio may be used. The synchros 14 and 16 would be mechanically geared by the gear train 18 to have a zero cross-over point of both the fine and coarse sine signals in phase at an initial or zero altitude reference point.

Figure 2:
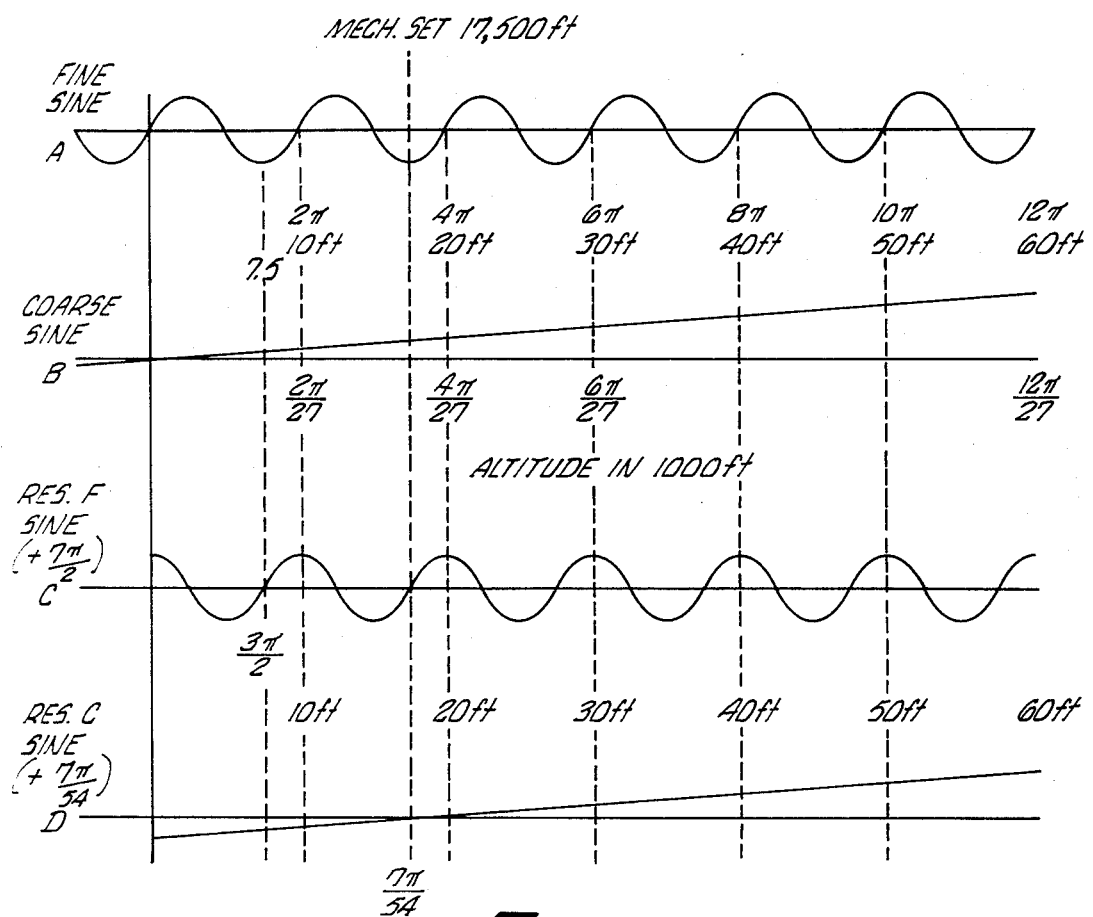
FIG. 2 is a schematic diagram illustrating a series of waveforms that are useful in describing the operation of a synchro differential transmitter as it pertains to the subject invention.

Referring to FIG. 2, waveforms A and B respectively illustrate a fine sine signal and a coarse sine signal which have been correlated with altitude. As shown, the fine sine signal may include several complete cycles over a given altitude range, whereas only a fraction of a cycle of the coarse sine signal would be involved. Where the frequency, or cyclic rate, of the coarse sine signal is selected to be suitably low, the central portion of the cross-over segment (i.e., between $-\pi/2$ and $+\pi/2$) approximates a straight line. The amplitude levels of the central portion of the cross-over segment would then be unique and able to be correlated with a particular altitude.

Referring to FIG. 2, assume that the fine sine signal (waveform A) represents 10,000 feet per cycle and that the coarse sine signal, using a multiple of 27:1, represents 270,000 feet per cycle. For an operating altitude range of 0–60,000 feet, six complete cycles of the fine sine signal would be involved while approximately 22 percent of a cycle ($12\pi\theta/27$) of the coarse sine signal would be used.

As symbolically shown by FIG. 1, the instrument panel 12 may include a pair of synchro differential transmitters 20 and 22 which have the rotors thereof ganged to be simultaneously responsive to rotation of a knob 24. As is common, the synchro differential transmitters 20 and 22 serve to add the mechanical rotor angle to the electrical angle defined by the fine and coarse signals respectively applied at the three-wire inputs of the transmitters 20 and 22. The resulting signals provided from the differential transmitters 20 and 22 are herein referred to as resolved sinusoidal signals. These resolved signals would represent the fine and coarse signals (waveforms A and B) having the mechanical rotor angle added thereto. Otherwise considered, the differential transmitters 20 and 22 would provide a phase shift of the signals applied thereto wherein the phase shift angle corresponds to the rotor angle.

In practice, this rotor angle may correspond to an altitude selected by a pilot through rotation of the knob 24. Waveforms C and D of FIG. 2 show the fine and coarse sine signals illustrated by waveforms A and B both shifted such that zero cross-over points of both signals coincidently occur at the point corresponding to an altitude of 17,500 feet. The fine sine signal of waveform A would be shifted by an angle of $3\pi/2$ to produce the resolved fine sine signal of waveform C. The coarse sine signal of waveform B on the other hand would be shifted by an angle of $7\pi/54$ to obtain the resolved coarse sine signal of waveform D. However viewed, the coincidently occuring zero cross-over points will be at a point corresponding to a desired altitude, and will there provide a new reference datum. The amplitude of the fine and coarse signals would then represent altitude referenced to the new reference datum, which in the example would be 17,500 feet.

As earlier explained, the fine sine signal may not be used alone due to the cyclic ambiguity, i.e., a particular amplitude value occuring at least once each cycle, while the coarse sine signal would lack the required resolution due to the inherent amplitude jitter caused by the mechanical gearing and phasing and therefore is also unsuitable to be used alone. However, when both fine and coarse signals are used as described above, a particular cross-over point of the fine sine signal is identified and selected by the coarse sine signal, and that segment of the fine sine signal may then be used as a control signal if isolated from other similar segments that are included in preceding and succeeding cycles of the fine sine signal.

Figure 3:
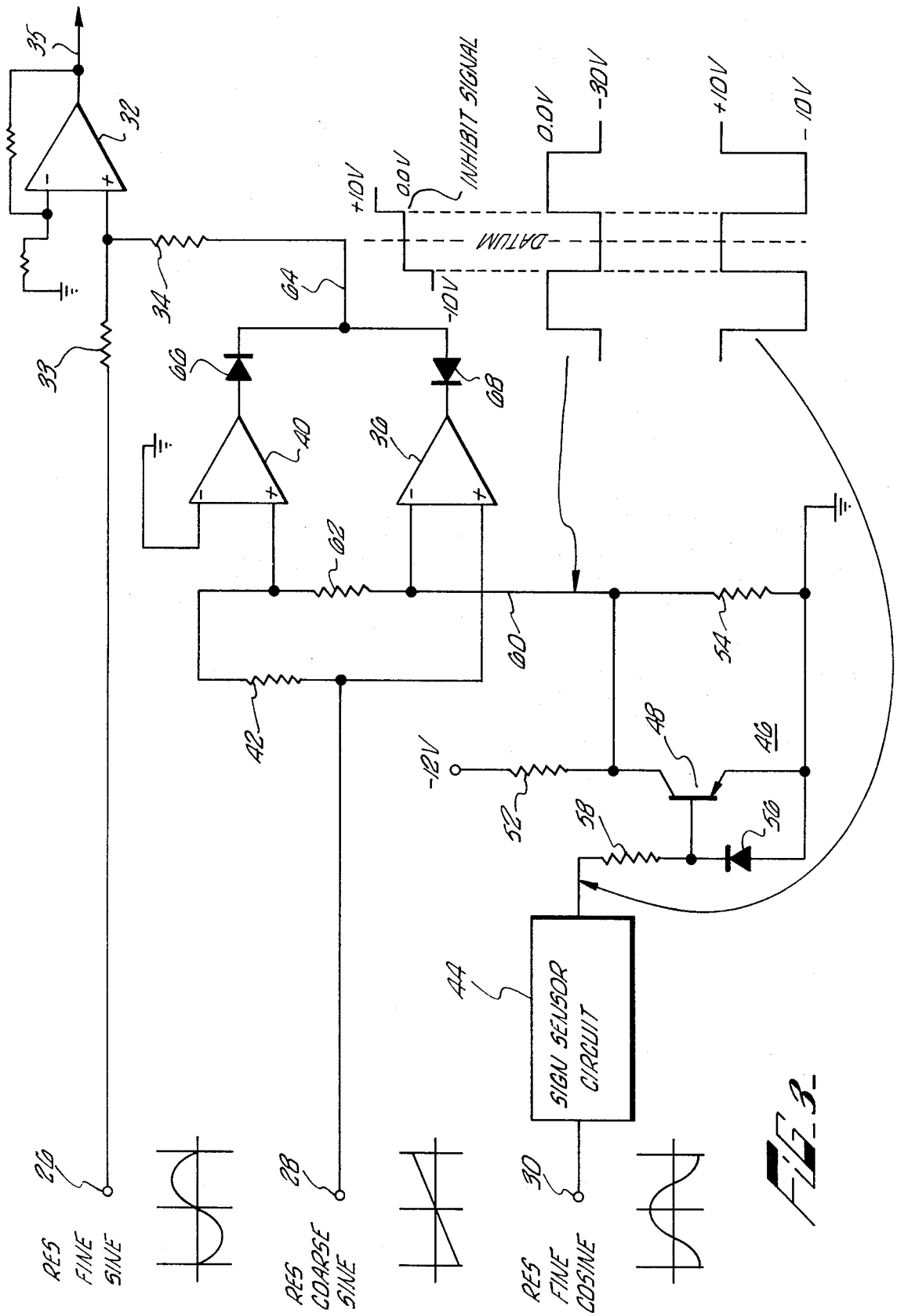
FIG. 3 is a schematic diagram illustrating a discriminator circuit in accordance with the subject invention.

The subject discriminator circuit operates to isolate a selected cross-over segment of the resolved (res.) fine sine signal (waveform C, FIG. 2) by generating an inhibit signal which, when summed or combined with the res. fine sine signal by a summing amplifier, effectively masks all portions of the res. fine sine signal except for the selected cross-over segment. Referring to FIG. 3, the res. fine sine, res. coarse sine, and res. fine cosine signals provided by the synchro differential transmitters 20 and 22 are respectively applied to terminals 26, 28 and 30.

The terminal 26 is connected to apply the fine sine signal to a summing circuit 32 which operates to sum the inhibit signal provided from the subject discriminator circuit with the res. fine sine signal. The summing circuit 32 may be a conventional summing amplifier which is configured to provide a maximum output signal, such as $\pm 10$ volts, whenever the fine sine signal or the inhibit signal provided by the discriminator circuit drives the summing amplifier 32 to saturation and thereby provides such maximum positive or negative output levels. The desired result may be obtained, for example, by having the input terminal of the summing amplifier, to which the res. fine sine signal and the inhibit signal are applied, weighted with resistors 33 and 34 to allow the inhibit signal to have a significantly higher gain. The summing amplifier would then be saturated whenever the inhibit signal is at a $\pm 10$ volt level and the amplifier output at the terminal 35 would be maintained at the corresponding maximum positive or negative level. The gain of the res. fine sine signal would be comparatively insufficient to produce any change in the amplifier output signal where the amplifier 32 is saturated by the application of the inhibit signal.

The terminals 28 and 30 serve as inputs to the discriminator circuit. The res. coarse sine signal and the res. fine cosine signal are respectively applied to these terminals 28 and 30. Appropriate demodulators (not shown) may be coupled to receive signals applied to the terminals 26, 28 and 30 where such signals are, for example, modulated on a carrier frequency.

A pair of operational amplifiers 36 and 40 are coupled to the input terminal 28 to receive the res. coarse sine signal at the positive or non-inverting inputs thereof. As shown, the terminal 28 is directly coupled to the positive input of the amplifier 36 while a resistor 42 is used to couple terminal 28 to the positive terminal of the amplifier 40. The function of the resistor 42 is discussed hereinbelow in greater detail.

The res. fine cosine signal is applied via the terminal 30 to a sign sensor circuit 44 which provides a square wave output signal corresponding to the res. fine cosine signal. An exemplary square wave signal is illustrated in FIG. 3 and also by waveform F of FIG. 4. The sign sensor circuit 44 may be of any conventional type, i.e., level detector, bistable multi-vibrator, etc.

An inverter circuit 46 is coupled to receive the square wave produced by the sign sensor circuit 44 and serves to provide an inverted square wave signal that precisely varies between 0 and a selected negative voltage, i.e., −3 volts. The inverter circuit 46 may include a PNP transistor 48 having the collector terminal thereof connected via a resistor 52 to a negative biasing voltage source. A biasing resistor 54 is connected between the collector and the emitter terminals of the transistor 48. A diode may be connected between the base and the emitter terminals to protect the base-to-emitter junction of the transistor 48.

The square wave signal provided by the sign sensor circuit 44 is applied to the base terminal of the transistor 48 via a resistor 56. The transistor 48 is rendered conductive whenever the square wave is at a −10 volt amplitude level. The output of the inverter circuit 46 is provided at a lead 60 which is connected to the junction of the collector terminal and the resistors 52 and 54. The inverter circuit output will be maintained at ground potential (0 volts) when the transistor 48 is conductive. The transistor 48 is non-conductive whenever the square wave from the sign sensor 44 is at a +10 volt level. The resistors 52 and 54 then operate as a voltage divider by being coupled in series between the negative biasing voltage source and a ground terminal. The resistors 52 and 54 may thus be selected to provide a desired negative voltage at the lead 60. In this case −3 volts has been selected for reasons to be hereinafter discussed in greater detail.

The inverter circuit 48 thus operates to provide an inverted square wave which corresponds to the square wave output of the sign sensor 44 and to the res. fine cosine signal applied to the input terminal 30 wherein the inverted square wave precisely varies between 0 and a selected negative voltage level.

The inverted square wave serves as a biasing signal that is applied via the lead 60 to the negative or inverting terminal of the operational amplifier 36 and to the positive or non-inverting terminal of the operational amplifier 40 via a resistor 62.

The desired inhibit signal (waveform H, FIG. 4) is provided at an output terminal 64 of the discriminator circuit via either of a pair of diodes 66 and 68 which are coupled to the outputs of the amplifiers 40 and 36, respectively.

By way of example, but not in a limiting sense, elements having the below enumerated types and values may be used in a discriminator circuit in accordance with the present invention:

| | |
|---|---|
| Amplifiers 36 and 40 | Type LM101 |
| Resistors 42 and 62 | 18 kilohms |
| Resistor 52 | 4.53 kilohms |
| Resistor 54 | 1.5 kilohms |
| Resistor 58 | 10 kilohms |
| Transistor 48 | Type 2N2907A |
| Diodes 56, 64 and 66 | Type IN4454 |

Figure 4:
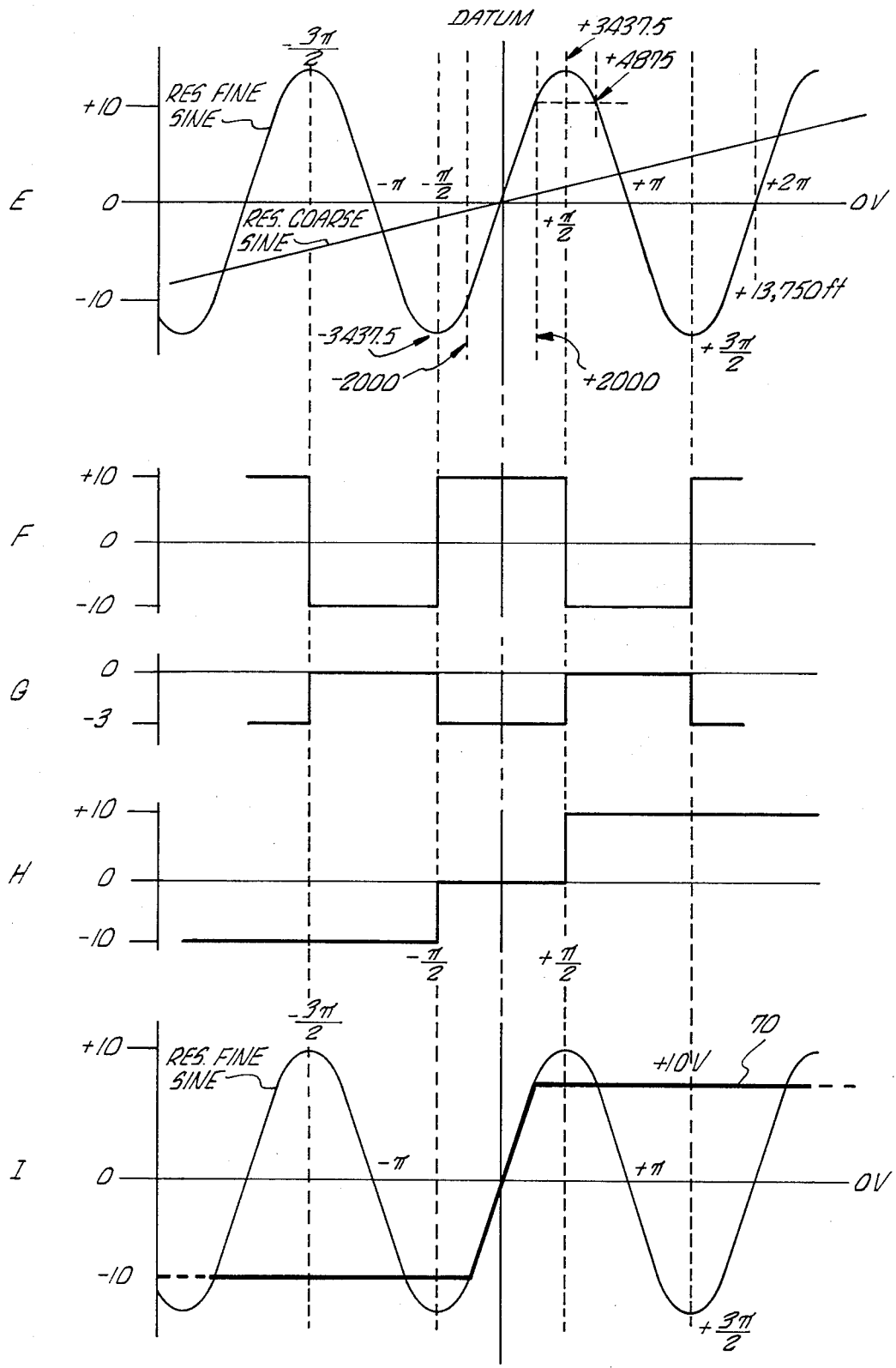
FIG. 4 is a schematic diagram illustrating a series of waveforms that are useful in describing the operation of the discriminator circuit in accordance with the subject invention.

The operation of the subject discriminator circuit is now considered with reference to FIG. 4. The cross-over portions of the res. fine sine signal and the res. coarse sine signal (waveforms C and D, FIG. 2) have been superimposed and illustrated as waveform E. As earlier discussed, and as shown, the zero cross-over points are coincident and occur at a reference datum corresponding to a selected altitude. As an example, let it be assumed that each cycle of the res. fine sine signal corresponds to 13,750 feet. If the reference datum corresponds to 20,000 feet, the $+2\pi$ point on the res. fine sine curve would correspond to 33,750 feet. Similarly, the $-2\pi$ point would correspond to an altitude of 6,520 feet. The cross-over segment which is centered at the reference datum, may be selected to correspond to a range of 4,000 feet (20,000 ± 2,000 feet). This may be simply accomplished by having the summing amplifier 32 become saturated by input signals (res. fine sine signal) having an amplitude level corresponding to ± 2,000 feet. As shown by waveform E, if the sine signal has a peak amplitude of 12 volts, the summing amplifier 32 may be designed to be saturated at ± 10 volts which corresponds to the amplitude level for the ± 2,000 feet points. A saturated output voltage of ± 10 volts would then be provided for altitudes straying outside the ± 2,000 volts. More particularly, using the exemplary values of waveform E, the res. fine sine signal would itself cause the summing amplifier 32 to be saturated and maintained at ± 10 volts for altitudes of 22,000 feet through 26,875 feet and maintained at −10 volts for altitudes of 13,125 feet through 18,000 feet. Between 18,000 feet and 22,000 feet, the zero cross-over segment would increase near-linearly from −10 volts to +10 volts, where an altitude of 20,000 feet would result in a 0 volt amplitude.

As may be observed from waveforms F and G, the square wave provided by the sign sensor circuit 44, and the inverted square wave from the inverter 46, respectively, the biasing signal applied to the amplifiers 36 and 40 will be at −3 volts for altitudes between 16,562.5 to 23,437.5 feet corresponding to the $\pm \pi/2$ radians points on opposite sides of the reference datum. The −3 volt signal will, when applied to the amplifiers 36 and 40, cause the diodes 66 and 68 to both be reverse biased since the output of the amplifiers 36 and 40 would be positive and negative, respectively. The inhibit signal level at the discriminator output lead 64 will accordingly be maintained at 0 volts in the region between $-\pi/2$ to $+\pi/2$ as shown by waveform H, FIG. 4.

The inhibit signal for altitudes between 16,562.5 and 23,437.5 feet will thus effectively permit the res. fine sine signal to be applied to the summing amplifier 32 without modification to produce the above discussed output at the terminal 35.

For altitudes in the ranges 23,437.5 to 30,312.5 feet (i.e., $\pi/2$ to $3\pi/2$) and 9,687.5 to 16,562.5 feet (i.e., $-3\pi/2$ to $-\pi/2$) a 0 bias voltage (see waveform G) will be provided from the inverter 46 to the amplifiers 36 and 40. The res. coarse sine signal will, however, attain an amplitude establishing its correct polarity (see waveform E). The amplifiers 36 and 40 may thus be connected to be saturated by the res. coarse sine signal applied from the terminal 28 and produce a +10 volt output. In detail, a positive res. coarse sine signal provided through the resistor 42 to the positive input of the amplifier 40 would cause the +10 volt signal to be provided through the diode 66 to the output terminal 64. A negative res. coarse sine signal would cause a −10 volt signal to be provided through the diode 68 to the terminal 64. The resistor 62 serves to effectively isolate the res. coarse sine signal from the negative input terminal of the amplifier 36.

For regions beyond ± 3 π/2, the res. coarse sine signal will have attained amplitude levels greater than ± 3 volts and when summed with a −3 volt bias signal provided from the inverter 46 would maintain the amplifiers 36 or 40 saturated at −10 volts or +10 volts, respectively.

It is thus clear that an inhibit signal of −10 volts will be provided for all altitudes below 16,562.5 feet (−π/2) and that a +10 volt level will be maintained for altitudes above 23,437.5 feet (+π/2). The ± 10 volts, as earlier explained, may be used to satured a summing amplifier 32 to produce a corresponding ± 10 volt output at the terminal 34. Thus for all altitudes outside the ± 2,000 feet of interest, a control signal at the terminal 34 will be maintained at −10 volts for altitudes lower than 18,000 feet and at +10 volts for altitudes higher than 22,000 feet. As earlier mentioned, the isolated cross-over segment of the res. fine sine signal will provide a precise altitude indication in the ± 2,000 feet region.

Waveform I, FIG. 4, illustrates a res. fine sine signal superimposed with the ± 10 volt portions of the inhibit signal. The graph in heavy lines and designated 70 represents the control signal that would be provided at the terminal 34.

It may now be understood that the control signal 70 illustrated by waveform I may be provided to an aircraft control system. When the control signal has an amplitude of 0 volts, the aircraft would be at the desired altitude, i.e., the earlier mentioned 20,000 feet. Where, however, the aircraft strays to levels such as between 18,000 and 22,000 feet, the selected cross-over segment of the res. fine sine signal provides a linearly increasing signal level corresponding to the increasing distance away from the reference datum. For altitudes outside the ± 2,000 feet, the control signal would be maintained at a constant positive or negative level such that the actual control system would be forced to continually proceed towards the desired datum level until the datum is attained.

The significance of the constant control voltage level effected by the inhibit signal is particularly important when considering that an automatic pilot may be set for a desired altitude prior to, or immediately after, take-off. For example, using the exemplary values discussed hereinabove in connection with the waveforms E through I, a cross-over point of the res. fine sine signal would have been reached before reaching the 20,000 feet altitude (cyclic ambiguity). In the present case, since the control signal would be maintained at −10 volts commencing at zero altitude, all cross-over segments of the res. fine sine signal, other than the selected segment, are masked and the cyclic ambiguity is effectively eliminated.

It is to be understood that although specific voltage levels, coarse/fine signal ratios, and altitude/cycle ratios have been discussed hereinabove, that other values may be readily employed as is appropriate. Further, it is understood that although a particular segment of the res. fine sine signal has been selected in the foregoing discussion, any other segment of the res. sine signal may be selected and isolated by a discriminator circuit by having the res. coarse sine signal and the res. fine cosine signal appropriately phase shifted with respect to the res. fine sine signal.

From the foregoing description, it is now clear that the subject invention provides a discriminator circuit that generates an inhibit signal having steady state positive and negative level portions separated by a neutral or zero level segment which inhibit signal may be summed with a particular sinusoidal signal to mask all portions thereof except that portion coinciding with the neutral segment.

While a preferred embodiment of the present invention has been described hereinabove, it is intended that all matter contained in the above description and shown in the accompanying drawings be interpreted as illustrative and not in a limiting sense and that all modifications, constructions and arrangements which fall within the scope and spirit of the invention may be made.

What is claimed is:

1. A discriminator circuit for providing an output signal that can be used to isolate a selected portion of a sinusoidally fluctuating signal when combined therewith, the discriminator circuit comprising:
   first means for providing positive output signals in response to the application of positive signals at an input thereof;
   second means for providing negative output signals in response to the application of negative signals at an input thereof;
   means for enabling the application of a coarse signal to said first and second means, said coarse signal having an amplitude that may vary from a negative value to a positive value, a zero value separating said positive and negative values and occurring coincidently with the portion to be selected of a sinusoidally fluctuating signal, said first and second means respectively providing positive and negative output signals in accordance with the amplitude and polarity of said coarse signal; and
   biasing means for providing a biasing signal to said first and second means, said biasing signal having an amplitude that varies as a square wave function between a zero value and a selected negative value, said first and second means being maintained to have a zero value output signal by said bias signal when having an absolute amplitude exceeding the positive or negative value of said coarse signal.

2. The discriminator circuit defined by claim 1, said first means including:
   a first operational amplifier having a non-inverting input terminal to which said coarse signal is applied, and
   means connected to the output of said first operational amplifier for only transmitting to an output of said first means positive signals provided by said first operational amplifier; said second means including:
   a second operational amplifier having a non-inverting input terminal to which said coarse signal is applied, and
   means connected to the output of said second operational amplifier for only transmitting to an output of said second means negative signals provided by said second operational amplifier.

3. The discriminator circuit defined by claim 2, said means connected to the output of said first operational amplifier including a semiconductor device that is connected to be forward biased when the output signal of said first operational amplifier is positive.

4. The discriminator circuit defined by claim 3, said means connected to the output of said second operational amplifier including a semiconductor device that is connected to be forward biased when the output signal of said second operational amplifier is negative.

5. The discriminator circuit defined by claim 1, said first means and said second means respectively including first and second operational amplifiers each having a non-inverting input terminal to which said coarse signal is applied, said first operational amplifier having connected to an output thereof first semiconductor means for only transmitting positive output signals provided by said first operational amplifier, said second operational amplifier having connected to an output thereof second semiconductor means for only transmitting negative output signals provided by said second operational amplifier, said bias signal being applied to the non-inverting input terminal of said first operational amplifier and to an inverting input terminal of said second operational amplifier to maintain the output signals of both said first and second means at said zero level when the amplitude of said coarse signal is less than the amplitude of said bias signal.

6. The discriminator circuit defined by claim 1, said biasing means including:

sign sensor means, connected to receive a sinusoidally fluctuating signal having a maximum value occurring coincidently with said zero value of said coarse signal, for providing a square wave signal that is in-phase with said sinusoidally fluctuating signal applied to said sensor means; and inverter means for inverting said square wave signal from said sign sensor means to provide said bias signal.

7. The discriminator circuit defined by claim 6, said inverter means including means for adjusting the range of voltages between which said bias is intended to vary.

8. The discriminator circuit defined by claim 7, said first means and said second means respectively including first and second operational amplifiers each having a non-inverting input terminal to which said coarse signal is applied, said first operational amplifier having connected to an output thereof first semiconductor means for only transmitting positive output signals provided by said first operational amplifier, said second operational amplifier having connected to an output thereof second semiconductor means for only transmitting negative output signals provided by said second operational amplifier, said bias signal being applied to the non-inverting input terminal of said first operational amplifier and to an inverting input terminal of said second operational amplifier to maintain the output signals of both said first and second means at said zero level when the amplitude of said coarse signal is less than the amplitude of said bias signal.

* * * * *